(12) United States Patent
Rohde et al.

(10) Patent No.: US 11,511,239 B2
(45) Date of Patent: *Nov. 29, 2022

(54) HEATED FLASH-BOILING DOSER WITH INTEGRATED HELIX

(71) Applicant: Faurecia Emissions Control Technologies, USA, LLC, Columbus, IN (US)

(72) Inventors: John Rohde, Columbus, IN (US); Anthony Burnet, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,916

(22) Filed: Apr. 29, 2020

(65) Prior Publication Data

US 2021/0339208 A1 Nov. 4, 2021

(51) Int. Cl.
*B01F 23/21* (2022.01)
*B01F 25/313* (2022.01)
*F01N 3/20* (2006.01)

(52) U.S. Cl.
CPC .......... *B01F 23/211* (2022.01); *B01F 25/313* (2022.01); *F01N 3/2066* (2013.01); *F01N 2610/02* (2013.01); *F01N 2610/14* (2013.01)

(58) Field of Classification Search
CPC .. B01F 3/04014; B01F 3/04021; B01F 5/045; F01N 3/2066; F01N 2610/02; F01N 2610/14; F02M 53/06
See application file for complete search history.

(56) References Cited

U.S. PATENT DOCUMENTS

| | | | |
|---|---|---|---|
| 4,486,270 | A | 12/1984 | Kaasenbrood |
| 5,240,688 | A | 8/1993 | Von Harpe |
| 5,590,521 | A | 1/1997 | Schnaibel |
| 5,827,490 | A | 10/1998 | Jones |
| 6,077,491 | A | 6/2000 | Cooper |
| 7,449,162 | B2 | 11/2008 | Schaller |
| 7,595,034 | B2 | 9/2009 | Nissinen |
| 7,984,609 | B2 | 7/2011 | Andreas |
| 8,100,191 | B2 | 1/2012 | Beheshti |

(Continued)

FOREIGN PATENT DOCUMENTS

| | | |
|---|---|---|
| CH | 707551 | 8/2014 |
| CN | 104265422 | 1/2015 |

(Continued)

OTHER PUBLICATIONS

Zhanfeng Qi, Shusen Li, Xiuli Guo, "Development, Application and Direction of Development of Urea-SCR", International Journal of Multimedia and Ubiquitous Engineering, 2016, pp. 131-142, vol. 11, Issue No. 2016.

(Continued)

*Primary Examiner* — Audrey B. Walter
(74) *Attorney, Agent, or Firm* — Barnes & Thornburg LLP

(57) ABSTRACT

An exhaust aftertreatment system for use with over-the-road vehicle is disclosed. The exhaust aftertreatment system includes a reducing agent mixer with a mixing can and a flash-boil doser configured to inject heated and pressurized reducing agent into the mixing can for distribution throughout exhaust gases passed through the mixing can.

12 Claims, 4 Drawing Sheets

(56) References Cited

U.S. PATENT DOCUMENTS

Figure 1:
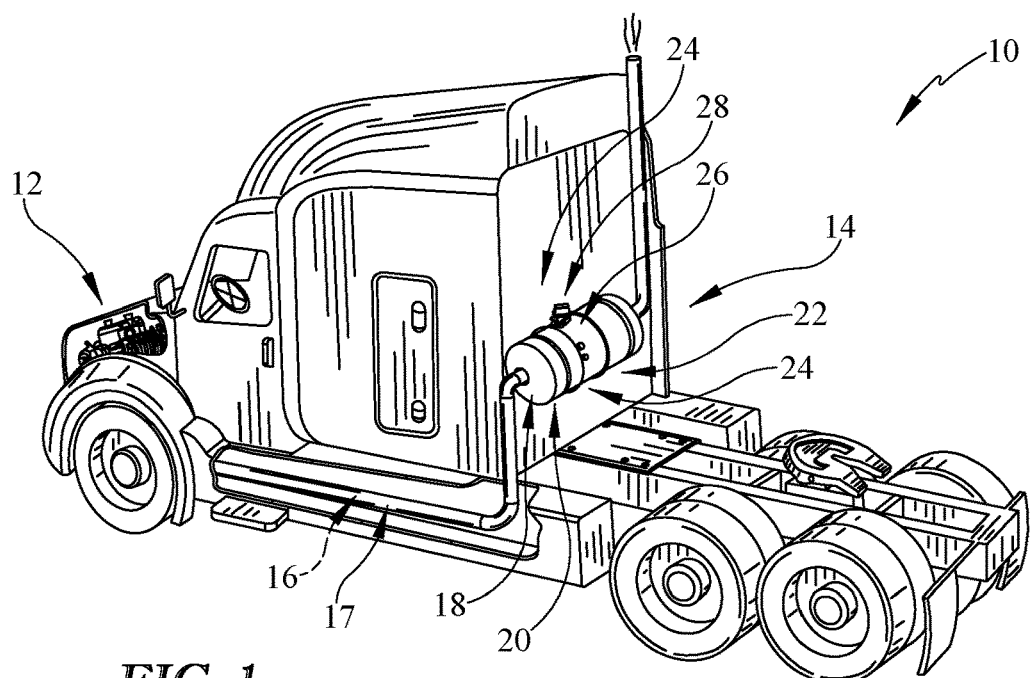

| | | |
|---|---|---|
| 8,413,427 B2 | 4/2013 | Mullins |
| 8,418,443 B2 | 4/2013 | Millet |
| 8,518,354 B2 | 8/2013 | Ayyappan |
| 8,763,372 B2 | 7/2014 | Pohl |
| 8,800,276 B2 | 8/2014 | Levin |
| 8,893,484 B2 | 11/2014 | Park |
| 8,967,484 B2 | 3/2015 | Nishizawa |
| 8,980,181 B2 | 3/2015 | Qi |
| 9,072,850 B2 | 7/2015 | McIntosh |
| 9,341,100 B2 | 5/2016 | Petry |
| 9,512,760 B2 | 12/2016 | Clayton, Jr. |
| 9,598,977 B2 | 3/2017 | Meyer |
| 9,683,447 B2 | 6/2017 | Gentile |
| 9,687,782 B1 | 6/2017 | Miao |
| 9,732,650 B2 | 8/2017 | Tomita |
| 9,771,850 B2 | 9/2017 | Henry |
| 10,337,380 B2 | 7/2019 | Willats |
| 2003/0079467 A1 | 5/2003 | Liu |
| 2005/0045179 A1 | 3/2005 | Faison |
| 2006/0218902 A1 | 10/2006 | Arellano |
| 2009/0031713 A1 | 2/2009 | Suzuki |
| 2009/0223211 A1 | 9/2009 | Bruck |
| 2009/0294552 A1 | 12/2009 | Trapasso |
| 2012/0322012 A1 | 12/2012 | Tsumagari |
| 2013/0232956 A1 | 9/2013 | Loman et al. |
| 2013/0239549 A1 | 9/2013 | Henry |
| 2013/0259755 A1 | 10/2013 | Kim |
| 2014/0314644 A1 | 10/2014 | Bugos |
| 2014/0363358 A1 | 12/2014 | Udd |
| 2015/0113957 A1* | 4/2015 | Bauer ............... F01N 11/00 60/274 |
| 2015/0128575 A1* | 5/2015 | Schmitt ............ F01N 3/0205 60/286 |
| 2015/0135683 A1 | 5/2015 | Petry |
| 2015/0315950 A1 | 11/2015 | Hagimoto |
| 2016/0017780 A1 | 1/2016 | Kinugawa |
| 2016/0053652 A1 | 2/2016 | Van Vuuren |
| 2016/0061083 A1 | 3/2016 | Pramas |
| 2017/0122169 A1 | 5/2017 | Ettireddy |
| 2017/0198621 A1 | 7/2017 | Gaiser |
| 2017/0204762 A1 | 7/2017 | Kotrba |
| 2018/0080360 A1 | 3/2018 | Kurpejovic |
| 2018/0142593 A1 | 5/2018 | Wang |
| 2019/0383187 A1 | 12/2019 | Sarsen |
| 2020/0131966 A1 | 4/2020 | Jeannerot |
| 2020/0332693 A1* | 10/2020 | Matsumoto ....... B01D 53/9409 |

FOREIGN PATENT DOCUMENTS

| | | |
|---|---|---|
| DE | 102009005012 | 7/2010 |
| DE | 102017101310 | 8/2017 |
| DE | 102018209405 | 12/2019 |
| EP | 2140117 | 1/2010 |
| EP | 2167860 A2 | 3/2010 |
| EP | 2302276 A1 | 3/2011 |
| EP | 2543837 | 1/2013 |
| EP | 2870331 | 5/2015 |
| EP | 3330222 | 6/2018 |
| EP | 3581773 | 12/2019 |
| GB | 2552040 | 1/2018 |
| GB | 2562178 | 11/2018 |
| GB | 2568269 | 5/2019 |
| JP | 2015078643 | 4/2015 |
| JP | 2020139426 | 9/2020 |
| KR | 20170013687 | 2/2017 |
| WO | 199956858 | 11/1999 |
| WO | 2005025725 A1 | 3/2005 |
| WO | 2006087553 | 8/2006 |
| WO | 2007124791 | 11/2007 |
| WO | 2008077587 | 7/2008 |
| WO | 2008108955 A1 | 9/2008 |
| WO | 2013036308 | 3/2013 |
| WO | 2018075061 | 4/2018 |
| WO | 2018100187 | 6/2018 |

OTHER PUBLICATIONS

Tue Johannessen, "Compact ammonia storage systems for fuel-efficient NOX emissions reduction", CTI conference on SCR Systems, Jul. 5, 2010.

Anu Solla, Marten Westerholm, Christer Soderstrom, Kauko Tormonen, "Effect of Ammonium Formate and Mixtures of Urea and Ammonium Formate on Low Temperature Activity of SCR Systems", SAE International, 2005.

Daniel Peitz, "Investigations on the catalytic decomposition of guanidinium formate, ammonium formate and methanamide as NH3-precuresors for the selective catalytic reduction of NOX", Univeristy of Erlangen-Nuremberg, 2010.

Extended European Search Report for European Appl. No. 19207724.6, dated Feb. 26, 2020, 8 pages.

Extended European Search Report for European Appl. No. 19203355.3, dated Feb. 26, 2020, 9 pages.

Extended European Search Report for European Appl. No. 19207953.1, dated Mar. 13, 2020, 7 pages.

Office Action dated Apr. 3, 2020, for U.S. Appl. No. 16/184,567 (pp. 1-15).

* cited by examiner

HEATED FLASH-BOILING DOSER WITH INTEGRATED HELIX

BACKGROUND

The present disclosure relates to exhaust aftertreatment systems for automotive applications, and particularly to the incorporation of flash-boil dosers into such systems.

SUMMARY

An over-the-road vehicle in accordance with the present disclosure including an internal combustion engine that produces exhaust gases and an exhaust aftertreatment system configured to treat the exhaust gases before releasing them into the atmosphere. The exhaust aftertreatment system can include a number of components such as, for example, a diesel oxidation catalyst (DOC), a diesel particulate filter (DPF), a selective catalytic reduction unit (SCR), and reducing agent mixer.

The reducing agent mixer includes a mixing can defining at least a portion of an exhaust passageway for receiving a flow of exhaust gases therein and a flash-boil doser. The flash-boil doser is mounted to the mixing can and configured to heat the reducing agent to drive the reducing agent to a predetermined pressure and to inject the reducing agent into the exhaust passageway of the mixing can.

The flash-boil doser includes a doser body in which reducing agent is conditioned before injection into an exhaust stream, a doser inlet coupled to the doser body, and a doser outlet coupled to the doser body. The doser body includes a housing and a heat exchanger assembly arranged in the housing. The heat exchanger assembly is configured to heat reducing agent thereby increasing a pressure within the heat exchanger assembly to drive injection of the reducing agent into the exhaust passageway. The doser inlet defines an inlet passageway that opens into the heat exchanger assembly to admit reducing agent from an associated reducing agent tank. The doser outlet defines an outlet passageway that opens from the heat exchanger assembly into the exhaust passageway of the mixing can.

The doser outlet is spaced apart axially from the doser inlet along a doser axis of the flash-boil doser such that the inlet passageway and outlet passageway are axially aligned. The doser body is arranged axially between the doser inlet and the doser outlet.

The heat exchanger assembly includes an outer sleeve, an inner sleeve, and at least one heater arranged around an outer surface of the outer sleeve. The outer sleeve is shaped to define a spiral channel that wraps around the doser axis and opens toward the doser axis. The inner sleeve is arranged in the outer sleeve to close the spiral channel to form a helical passageway between the outer sleeve and the inner sleeve. The helical passageway is in fluid communication with the inlet and outlet passageways. The heater arranged is configured to conductively heat the outer sleeve to heat reducing agent in the helical passageway.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
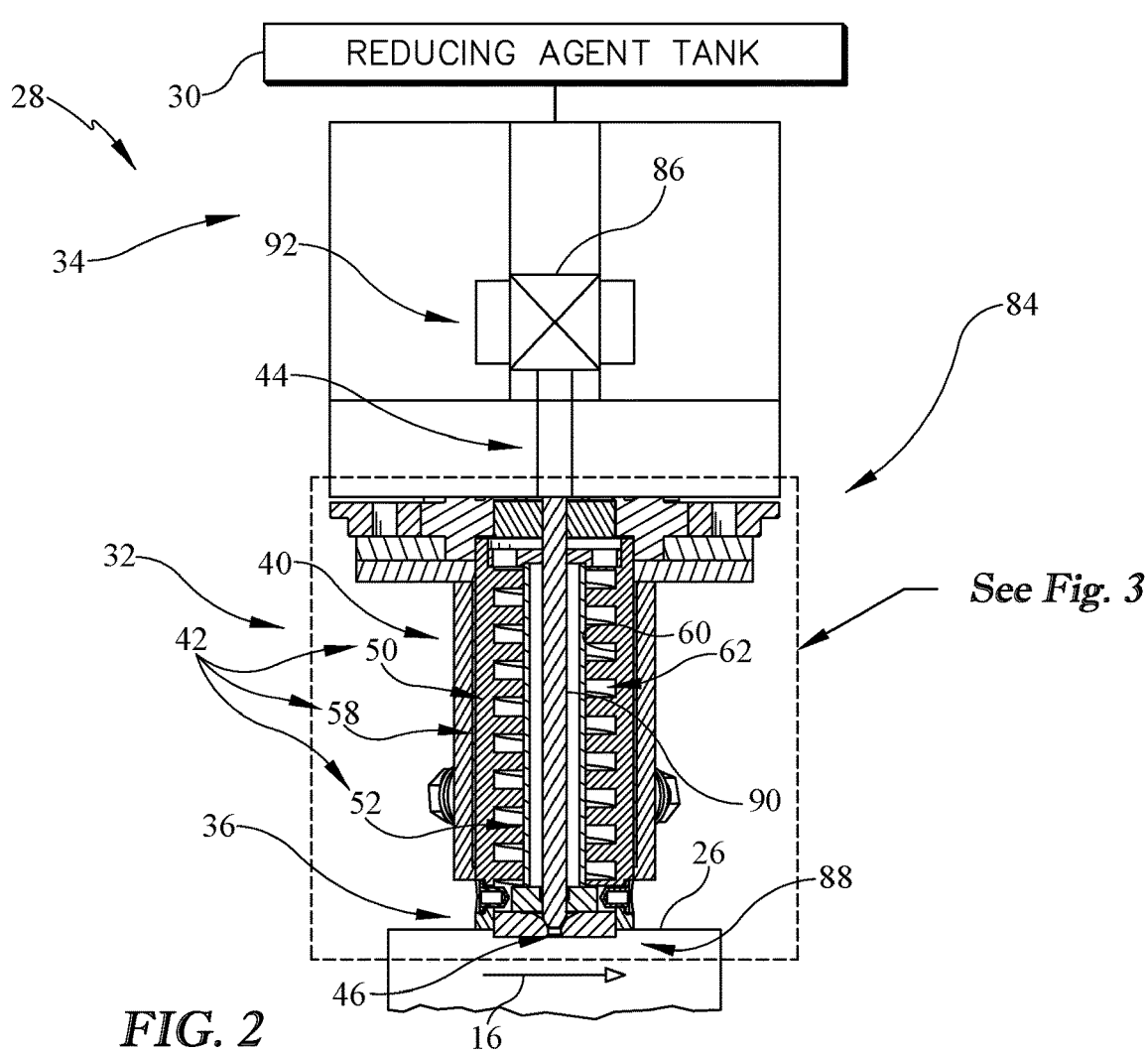
Figure 3:
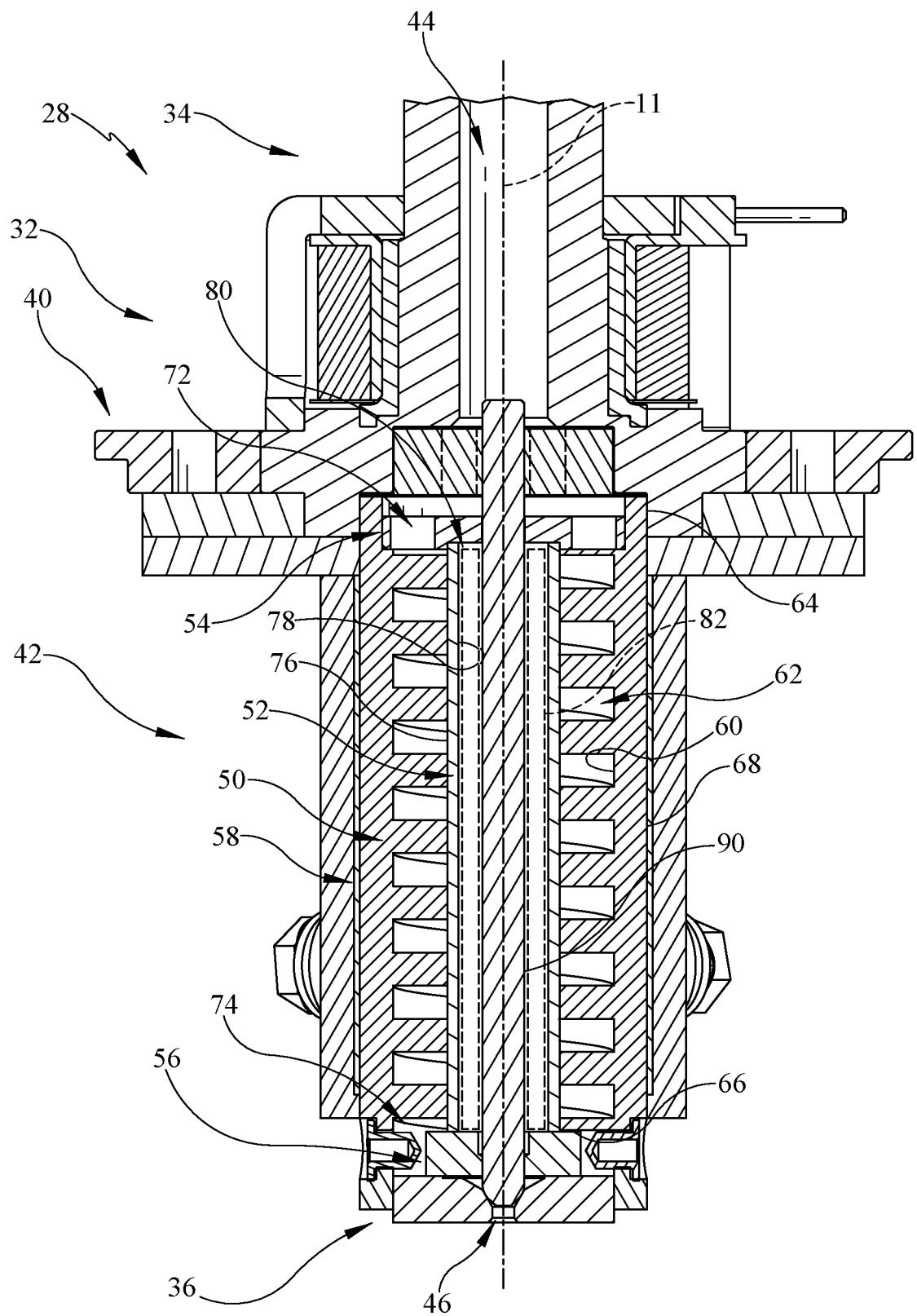

The detailed description particularly refers to the accompanying figures in which:

FIG. 1 is perspective view of an over-the-road automotive vehicle including an internal combustion engine and an exhaust aftertreatment system with a flash-boil doser configured to deliver a reducing agent into engine exhaust gases flowing through an exhaust conduit;

FIG. 2 is a diagrammatic view of the flash-boil doser included in the over-the-road vehicle of FIG. 1 showing that the flash-boil doser includes a doser body, a doser inlet coupled to the doser body defining an inlet passageway that admits reducing agent from an associated reducing agent tank into the doser body, and a doser outlet coupled to the doser body defining an outlet passageway that opens from the doser body into the exhaust passageway;

FIG. 3 is a detail diagrammatic view of the flash-boil doser of FIG. 2 showing the doser body includes a housing and a heat exchanger assembly arranged in the housing, the heat exchanger assembly including an outer sleeve shaped to define a spiral channel that wraps around a doser axis and opens toward the doser axis, an inner sleeve arranged in the outer sleeve to close the spiral channel to form a helical passageway between the outer sleeve and the inner sleeve, and at least one heater arranged around an outer surface of the outer sleeve to conductively heat the outer sleeve to heat reducing agent in the helical passageway.

Figure 4:
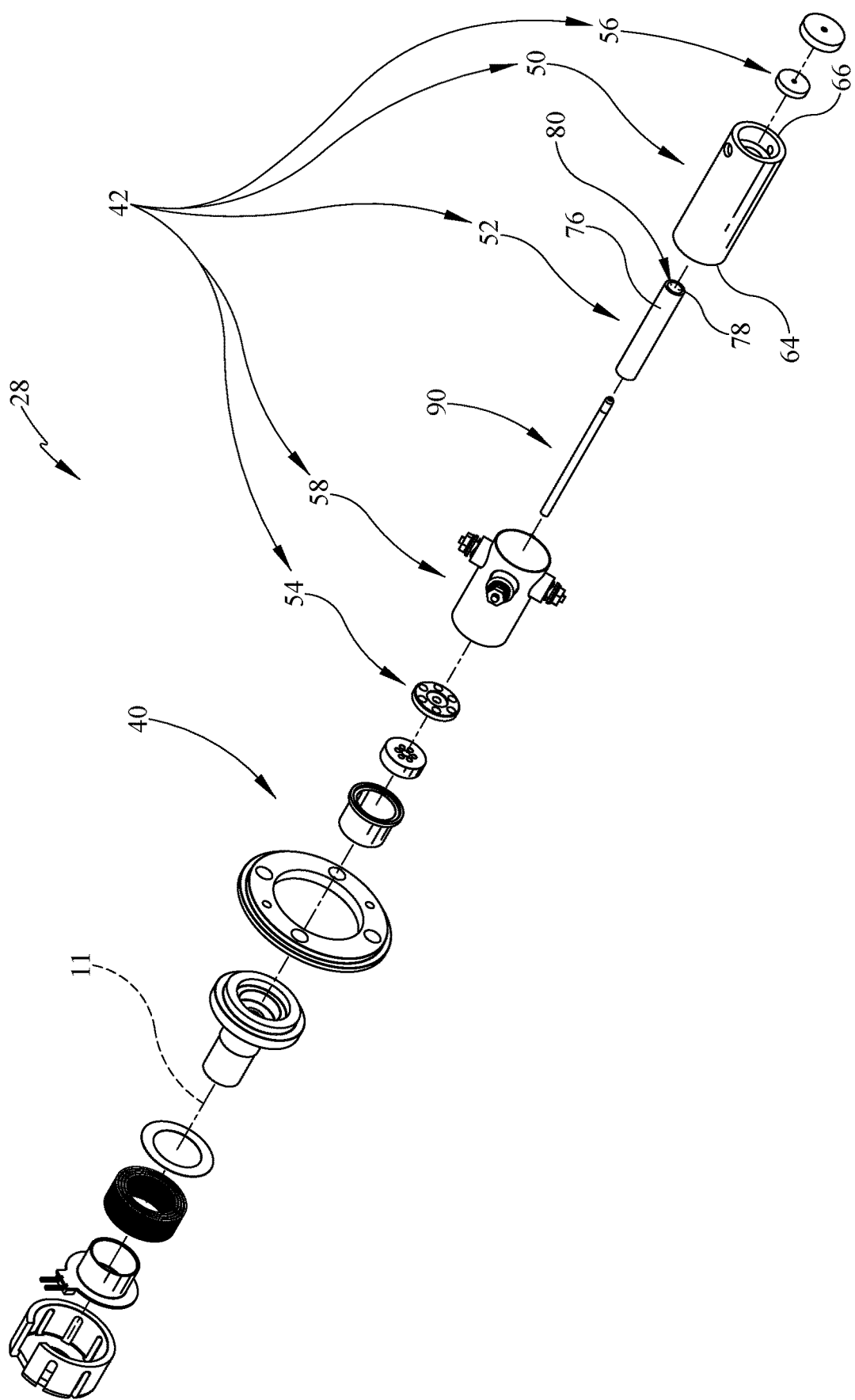
Figure 5:
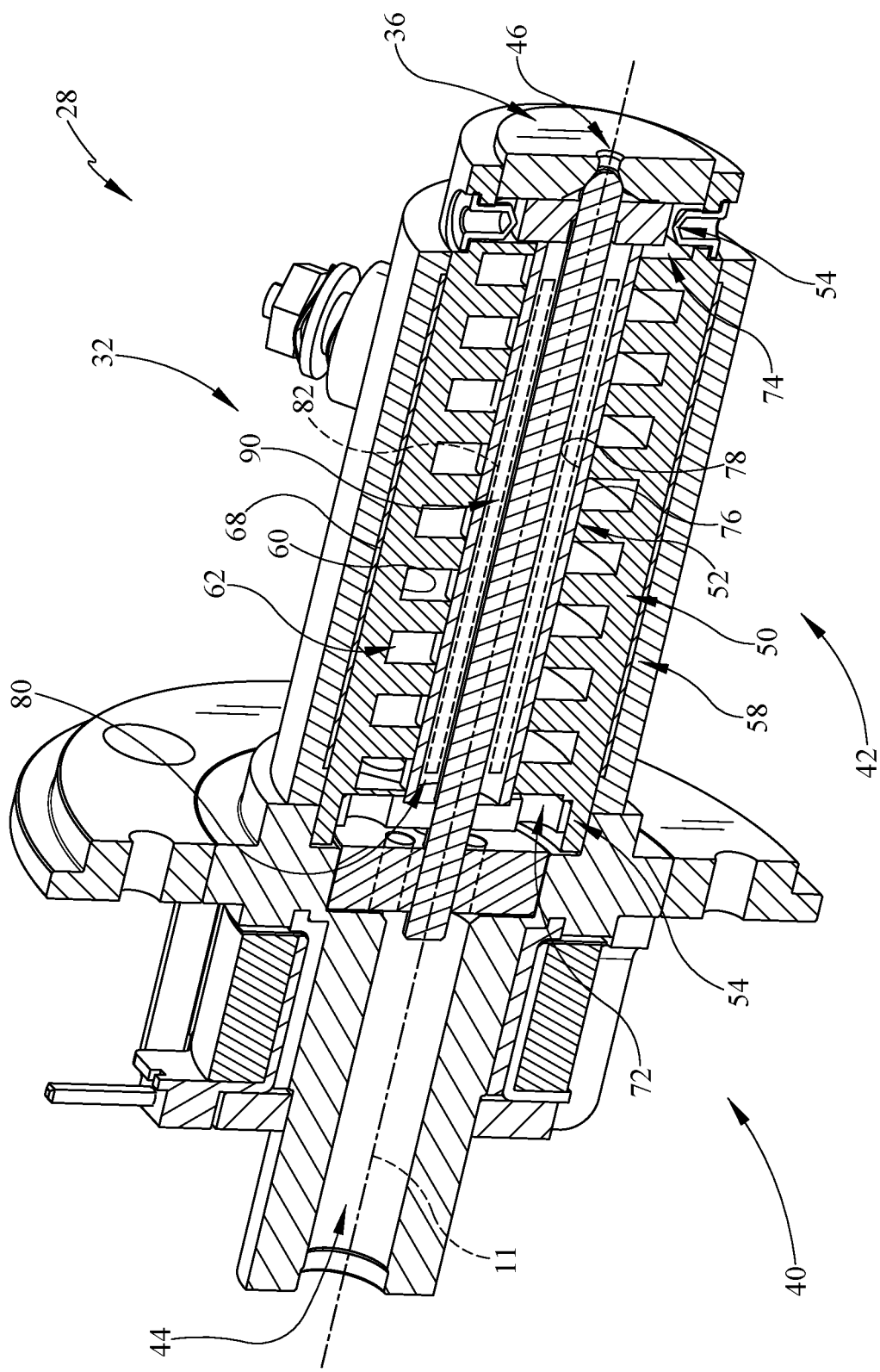

FIG. 4 is an exploded view of the flash-boil doser of FIG. 3 showing heat exchanger further includes inlet and outlet guide plates coupled to the respective ends of the outer sleeve to from an inlet and outlet of the helical passageway; and FIG. 5 is a cross-sectional view of the flash-boil doser of FIG. 3 showing;

DETAILED DESCRIPTION

For the purposes of promoting an understanding of the principles of the disclosure, reference will now be made to a number of illustrative embodiments illustrated in the drawings and specific language will be used to describe the same.

An illustrative over-the-road vehicle 10 includes an engine 12 and an exhaust aftertreatment system 14 in accordance with the present disclosure is shown, for example, in FIG. 1. The engine 12 is, illustratively, an internal combustion engine 12 configured to combust fuel and discharge exhaust gases that are carried through an exhaust passageway 16 defined by an exhaust conduit 17, treated by the exhaust aftertreatment system 14, and then released into the atmosphere. The exhaust aftertreatment system 14 is configured to reduce various effluents in the exhaust gases, such as, for example, nitrogen oxides (NOx), before the exhaust gases are released to the atmosphere.

In the illustrative embodiment, the exhaust aftertreatment system 14 includes a plurality of exhaust aftertreatment devices such as, for example, a diesel oxidation catalyst (DOC) 18, a diesel particulate filter (DPF) 20, and a selective catalytic reduction unit (SCR) 22, and a reducing agent mixer 24. The exhaust gases pass through or by each of the aftertreatment devices to remove or reduce different effluents. The reducing agent mixer 24 is mounted upstream of the SCR 22 and is configured to inject and mix a reducing agent, illustratively a urea solution, into the exhaust gases. Chemical reaction of the reducing agent with the exhaust gases occurs in downstream of the reducing agent mixer 24 in the SCR 22 to reduce $NO_x$ to produce treated exhaust gases before being released in the atmosphere.

The reducing agent mixer 24 includes a mixing can 26 and a flash-boil doser 28 as shown in FIGS. 1 and 2. The mixing can 26 is coupled fluidly with the exhaust passageway 16 to receive the exhaust gases flowing therethrough. The reducing agent is stored on the vehicle 10 in a reducing agent tank 30 and is conducted to the flash-boil doser 28 for heating prior to being discharged by the flash-boil doser 28 into the mixing can 26.

The flash-boil doser 28 includes a doser body 32, a doser inlet 34, and a doser outlet 36 as shown in FIGS. 2, 3, and 5. The doser body 32 includes a housing 40 and a heat exchanger assembly 42 that is arranged in the housing 40. The heat exchanger assembly 42 is configured to heat reducing agent and thereby increase a pressure within the heat exchanger assembly 42 to drive injection of the reducing agent into the exhaust passageway 16. The doser inlet 34 is coupled to the doser body 32 and defines an inlet passageway 44 that opens into the heat exchanger assembly 42 to admit reducing agent from the reducing agent tank 30. The doser outlet 36 is coupled to the doser body 32 and defines an outlet passageway 46 that opens from the heat exchanger assembly 42 into the exhaust passageway 16 of the exhaust aftertreatment system 14.

In the illustrative embodiment, the doser outlet 36 is spaced axially from the doser inlet 34 relative to a doser axis 11 of the flash-boil doser 28 as shown in FIGS. 2 and 5. The doser inlet and outlet 34, 36 are spaced apart axially along the doser axis 11 such that the inlet passageway 44 and outlet passageway 46 are axially aligned. The doser body 32 is arranged axially between the doser inlet 34 and doser outlet 36.

The heat exchanger assembly 42 includes an outer sleeve 50, an inner sleeve 52, guide plates 54, 56, and at least one heater 58 as shown in FIGS. 2-5. The outer sleeve 50 is shaped to define a spiral channel 60 that wraps around the doser axis 11 and opens toward the doser axis 11. The inner sleeve 52 is arranged in the outer sleeve 50 to close the spiral channel 60 to form a helical passageway 62 between the outer sleeve 50 and the inner sleeve 52. The guide plates 54, 56 are each coupled to a respective end of the outer sleeve 50 to define the heat exchanger inlet 72 and the heat exchanger outlet 74 in fluid communication with the helical passageway 62. The heater 58 is arranged around an outer surface 68 of the outer sleeve 50 and configured to conductively heat the outer sleeve 50 to heat reducing agent in the helical passageway 62.

The helical passageway 62 is in fluid communication with both the inlet passageway 44 and the outlet passageway 46 to admit reducing agent in to the helical passageway 62 and to inject reducing agent into exhaust passageway 16 as shown in FIGS. 2, 3, and 5. As the helical passageway 62 wraps around the doser axis 11, the reducing agent flowing through the helical passageway 62 has increased contact with the outer sleeve 50. In this way, the convective heat transfer between the outer sleeve 50 and the reducing agent in the helical passageway 62 may be increased.

In other embodiments, a flash-boil doser may include an outer sleeve and a helical insert that is arranged in the body to form a helical passageway. To efficiently transfer heat generated by the heater through the outer sleeve to the helix and ultimately to the reducing agent in the helical passageway, the helix insert requires an interference fit to the body. To achieve the interference fit the outer sleeve may be heated during assembly so that the interference between the helix insert and the outer sleeve is accomplished when the outer sleeve cools. Such an interference fit may be difficult and costly for manufacturing because the helix insert cannot be excessively pressed.

In the illustrative embodiments, the outer sleeve 50 is tapped to form the spiral channel 60 similar to a nut for a bolt. The inner sleeve 52 engages the outer sleeve 50 to close the spiral channel 60 and form the helical passageway 62, which eliminates the need for a separate helical insert. The inner sleeve 52 may be interference fit within the outer sleeve 50, while may eliminate heating the outer sleeve 50 during assembly and the need for tolerances to maintain interference by contraction. The helical passageway 62 formed between the outer and inner sleeves 50, 52 also improves thermal losses of the heat exchanger assembly 42 as well.

The guide plates 54, 56 include a first guide plate 54 and a second guide plate 56 that are coupled to the respective ends 64, 66 of the outer sleeve 50 as shown in FIGS. 3-5. The first, or inlet guide plate 54 is coupled to a first end 64 of outer sleeve 50 to form at least one heat exchanger inlet 72 that opens into the helical passageway 62. The second, or outlet guide plate 56 is coupled to a second end 66 of the outer sleeve 50 to form a heat exchanger outlet 74. The guide plates 54, 56 are coupled to the respective ends 64, 66 to block reducing agent from flowing into an inner passageway 80 of the inner sleeve 52.

The inner sleeve 52 is shaped to include an outer surface 76 and an inner surface 78 as shown in FIGS. 3-5. The outer surface 76 contacts the threads of the spiral channel 60 to form the helical passageway 62. The inner surface 78 defines the inner passageway 80 that extends axially through the inner sleeve 52. In the illustrative embodiment, the inner passageway 80 of the inner sleeve 52 is sized to receive a portion of an outlet valve 84 included in the doser outlet 36 as shown in FIGS. 3 and 5.

In the illustrative embodiment, the heat exchanger assembly 42 may further include an insulation layer 82 as suggested in FIGS. 3 and 5. The insulation layer 82 is arranged within the inner passageway 80 of the inner sleeve 52 around the portion of the outlet valve. The insulation layer 82 comprises a low thermal conductive material to insulate the outlet valve from the heat of the heater conducted through the outer sleeve 50 and the inner sleeve 52.

In some embodiments, the low thermal conductive material may comprise a ceramic material. In other embodiments, the low thermal conductive material may comprise a thermal conductive potting compound. In other embodiments, the low thermal conductive material may be another sleeve or bushing.

Turning again to the doser outlet 34, the doser outlet 34 includes a pressure-activated outlet valve 84 that blocks or allows flow through the outlet passageway 46 as shown in FIG. 2 The pressure-activated outlet valve 84 is configured to move from a normally-closed position to an open position when the predetermined pressure within the helical passageway 62 is reached. The pressure-activated outlet valve 84 moves from the normally-closed position to the open position to discharge the heated reducing agent from the helical passageway 62 through the outlet passageway 46 and into the exhaust passageway 16 for mixing with the exhaust gases therein.

The pressure-activated outlet valve 84 includes an inlet valve 86, an outlet valve 88, and a connector rod 90 as shown in FIG. 2. The inlet valve 86 blocks or allows flow through the inlet passageway 44, while the outlet valve 88 blocks or allows flow through the outlet passageway 46. The connector rod 90 mechanically interconnects the inlet valve 86 and the outlet valve 88 as shown in FIG. 2.

The connector rod 90 is configured to cause the inlet valve 86 to move to a closed position in response to motion of the pressure-activated outlet valve 84 to the opened position. The connector rod 90 is also configured to cause the inlet valve 86 to move to an opened position in response to motion of the pressure-activated outlet valve 84 to the closed position. Reducing agent is admitted into the helical passageway 62 when the inlet valve 86 is in the opened position. Reducing agent is discharged from the helical passageway 62 when the outlet valve 88 is in the opened position in response to the pressure within the helical passageway 62 reaching the predetermined pressure.

In the illustrative embodiments, the connector rod 90 extends through the inner passageway 80 as shown in FIGS. 2-5. The insulation layer 82 may extend around the connector rod 90 in the inner passageway 80 to insulate the connector rod 90 from the heat provided by the heater 58.

The heater 58 is configured to conductively heat the outer sleeve 50 which in turn then convectively heats the reducing agent that is admitted into the helical passageway 62. Meanwhile, the pressure-activated outlet valve 84 is in the normally-closed position due to the pressure of the reducing agent in the helical passageway 62 being less than the predetermined pressure. The pressure of the reducing agent in the helical passageway 62 may be increased by heating the reducing agent with the heater 58. As a result of this, the reducing agent expands due to thermal expansion raising the pressure inside the helical passageway 62. Due to the pressure of the reducing agent within the helical passageway 62, the reducing agent may be heated to a temperature that is higher than its normal boiling point. Additionally, the reducing agent may be pre-heated with additional heaters and/or pumps prior to entering the helical passageway 62. The pressure-activated outlet valve 84 changes to the open position once the predetermined pressure is reached within the helical passageway 62.

In the illustrative embodiment, the heater 58 is an electric resistive heating element that generates heat by passing an electrical current through a conductive material, i.e. a resistor. Electrical current is provided to the heater 58, which causes the resistor to generate heat to heat the reducing agent in the helical passageway 62.

In some embodiments, the heater 58 is a ceramic heating element. Similar to resistive heating elements that use metallic materials such as wire, the ceramic heating element generates heat by passing an electrical current through a ceramic material or ceramic plates. Electrical current is provided to the heater 58, which causes the resistor to generate heat to heat the reducing agent in the helical passageway 62. In other embodiments, the heater 58 is another type of electrical resistive heating element that actively generates heat when provided electrical power or current.

In the illustrative embodiments, The flash-boil doser 28 further includes a cooling system having coolers 92 configured to selectively cool the temperature of select components included in the flash-boil doser 28 as shown in FIGS. 2-5. The cooling system includes at least one cooler 92 coupled to the doser inlet 34 and aligned axially with the inlet valve 86. In some embodiments, another cooler 92 may be coupled to an outer surface of the doser outlet 38 and aligned axially with the outlet valve 88. The coolers 92 are illustratively embodied as ducts that hold and circulate a coolant fluid therethrough to cause heat transfer between the flash-boil doser 28 and the coolant fluid. The ducts of each cooler 92 may be sized according to an amount of thermal heat transfer desired at each location.

In illustrative embodiments, the heater 58 conductively heats the outer sleeve 50 and the inner sleeve 52 to then convectively heat the reducing agent in the helical passageway 62. The reducing agent or DEF may be heated to about 160 degrees Celsius. At this temperature, the DEF is at the saturated vapor pressure. At this temperature range DEF cavitation could occur. Another potential problem may be the temperature limits of the mechatronics of the flash-boil doser 28 (i.e. housing 40).

To help mitigate these issues, a cooling system is included. The cooling system includes coolers 92 with plumbing (metal tubing made of stainless steel, aluminum, or suitable DEF resistant material) in strategic areas to selectively cool these areas below the cavitation threshold and the mechatronic components. In the illustrative embodiment, the heater 58 may also act as a cooler 92 and be configured to selectively cool the temperature of the doser body 32.

The following numbered clauses include embodiments that are contemplated and non-limiting:

Clause 1. A flash-boil doser adapted for use in an exhaust aftertreatment system to inject a reducing agent into an exhaust passageway of the exhaust aftertreatment system, the flash-boil doser comprising a doser body including a housing and a heat exchanger assembly, the heat exchanger assembly arranged in the housing and configured to heat the reducing agent thereby increasing a pressure within the heat exchanger assembly to drive injection of the reducing agent into the exhaust passageway, a doser inlet coupled to the doser body that defines an inlet passageway that opens into the heat exchanger assembly to admit reducing agent from an associated reducing agent tank, and a doser outlet coupled to the doser body that defines an outlet passageway that opens from the heat exchanger assembly into the exhaust passageway, the doser outlet spaced apart axially from the doser inlet relative to a doser axis of the flash-boil doser.

Clause 2. The system of clause 1, any other suitable clause, or any combination of suitable clauses, wherein the heat exchanger assembly includes (i) an outer sleeve shaped to define a spiral channel that wraps around the doser axis and opens toward the doser axis, (ii) an inner sleeve arranged in the outer sleeve to close the spiral channel to form a helical passageway between the outer sleeve and the inner sleeve that is in fluid communication with the inlet and outlet passageways, and (iii) at least one heater arranged around an outer surface of the outer sleeve and configured to conductively heat the outer sleeve to heat the reducing agent in the helical passageway.

Clause 3. The system of clause 2, any other suitable clause, or any combination of suitable clauses, wherein the heat exchanger assembly further includes a first guide plate coupled to a first end of the outer sleeve to form a heat exchanger inlet that opens into the helical passageway and a second guide plate coupled to a second end of the outer sleeve to form a heat exchanger outlet that opens into the outlet passageway.

Clause 4. The system of clause 3, any other suitable clause, or any combination of suitable clauses, wherein the first and second guide plates are configured to block the reducing agent from flowing into an inner passageway that extends axially through the inner sleeve.

Clause 5. The system of clause 4, any other suitable clause, or any combination of suitable clauses, wherein the heat exchanger assembly further includes an insulation layer arranged in the inner passageway of the inner sleeve.

Clause 6. The system of clause 2, any other suitable clause, or any combination of suitable clauses, wherein the doser outlet includes a pressure-activated outlet valve that blocks or allows flow through the outlet passageway.

Clause 7. The system of clause 6, any other suitable clause, or any combination of suitable clauses, wherein the pressure-activated outlet valve is configured to move from a normally-closed position to an open position when a predetermined pressure within the helical passageway is reached to discharge the heated reducing agent from the helical passageway through the outlet passageway and into the exhaust passageway for mixing with the exhaust gases therein during use of the flash-boil doser in the exhaust aftertreatment system.

Clause 8. The system of clause 7, any other suitable clause, or any combination of suitable clauses, wherein the inner sleeve is shaped to include an inner passageway that extends axially through the inner sleeve and is sized to receive a portion of the pressure-activated outlet valve such that the heat exchanger assembly is arranged around a portion of the pressure-activated outlet valve.

Clause 9. The system of clause 8, any other suitable clause, or any combination of suitable clauses, wherein the heat exchanger assembly further includes an insulation layer arranged in the inner passageway of the inner sleeve around the portion of the pressure-activated outlet valve.

Clause 10. The system of clause 2, any other suitable clause, or any combination of suitable clauses, wherein the inner sleeve is interference fit with the outer sleeve.

Clause 11. A reducing agent mixer for use in an exhaust aftertreatment system for an over-the-road vehicle, the reducing agent mixer comprising a mixing can defining at least a portion of an exhaust passageway for receiving a flow of exhaust gases therein, and a flash-boil doser mounted to the mixing can and configured to heat a reducing agent to drive the reducing agent to a predetermined pressure and to inject the reducing agent into the exhaust passageway of the mixing can.

Clause 12. The reducing agent mixer of clause 11, any other suitable clause, or any combination of suitable clauses, wherein the flash-boil doser comprises a doser body including a housing and a heat exchanger assembly.

Clause 13. The reducing agent mixer of clause 12, any other suitable clause, or any combination of suitable clauses, wherein the heat exchanger assembly is arranged in the housing and configured to heat the reducing agent thereby increasing a pressure within the heat exchanger assembly to drive injection of the reducing agent into the exhaust passageway.

Clause 14. The reducing agent mixer of clause 13, any other suitable clause, or any combination of suitable clauses, wherein the flash-boil doser further comprises a doser inlet coupled to the doser body that defines an inlet passageway that opens into the heat exchanger assembly to admit reducing agent from an associated reducing agent tank.

Clause 15. The reducing agent mixer of clause 14, any other suitable clause, or any combination of suitable clauses, wherein the flash-boil doser further comprises a doser outlet coupled to the doser body that defines an outlet passageway that opens from the heat exchanger assembly into the exhaust passageway.

Clause 16. The reducing agent mixer of clause 15, any other suitable clause, or any combination of suitable clauses, wherein the doser outlet is spaced apart axially from the doser inlet relative to a doser axis of the flash-boil doser.

Clause 17. The reducing agent mixer of clause 16, any other suitable clause, or any combination of suitable clauses, wherein the heat exchanger assembly includes (i) an outer sleeve shaped to define a spiral channel that wraps around the doser axis and opens toward the doser axis, (ii) an inner sleeve arranged in the outer sleeve to close the spiral channel to form a helical passageway between the outer sleeve and the inner sleeve that is in fluid communication with the inlet and outlet passageways, and (iii) at least one heater arranged around an outer surface of the outer sleeve and configured to conductively heat the outer sleeve to heat the reducing agent in the helical passageway.

Clause 18. The reducing agent mixer of clause 17, any other suitable clause, or any combination of suitable clauses, wherein the heat exchanger assembly further includes a first guide plate coupled to a first end of the outer sleeve to form a heat exchanger inlet that opens in to the helical passageway and a second guide plate coupled to a second end of the outer sleeve to form a heat exchanger outlet that opens into the outlet passageway.

Clause 19. The reducing agent mixer of clause 18, any other suitable clause, or any combination of suitable clauses, wherein the first and second guide plates are configured to block the reducing agent from flowing into an inner passageway that extends through the inner sleeve.

Clause 20. The reducing agent mixer of clause 17, any other suitable clause, or any combination of suitable clauses, wherein the doser outlet includes a pressure-activated outlet valve that blocks or allows flow through the outlet passageway.

Clause 21. The reducing agent mixer of clause 20, any other suitable clause, or any combination of suitable clauses, wherein the pressure-activated outlet valve is configured to move from a normally-closed position to an open position when the predetermined pressure within the helical passageway is reached to discharge the heated reducing agent from the helical passageway through the outlet passageway and into the exhaust passageway for mixing with the exhaust gases therein during use of the flash-boil doser in the exhaust aftertreatment system.

Clause 22. The reducing agent mixer of clause 21, any other suitable clause, or any combination of suitable clauses, wherein the inner sleeve is shaped to include an inner passageway that extends axially through the inner sleeve and is sized to receive a portion of the pressure-activated outlet valve such that the heater assembly is arranged around a portion of the pressure-activated outlet valve.

Clause 23. The reducing agent mixer of clause 23, any other suitable clause, or any combination of suitable clauses, wherein the heat exchanger assembly further includes an insulation layer arranged in the inner passageway of the inner sleeve around the portion of the pressure-activated outlet valve.

Clause 24. The reducing agent mixer of clause 17, any other suitable clause, or any combination of suitable clauses, wherein the inner sleeve is interference fit with the outer sleeve.

Clause 25. An over-the-road vehicle, the vehicle comprising an internal combustion engine configured to produce a flow of exhaust gases that are conducted through an exhaust passageway defined by an exhaust conduit, and an exhaust aftertreatment system configured to treat the flow of exhaust gases.

Clause 26. The vehicle of clause 25, any other suitable clause, or any combination of suitable clauses, wherein the exhaust aftertreatment system comprises a reducing agent tank formed to store a reducing agent therein, a mixing can defining at least a portion of an exhaust passageway for receiving a flow of exhaust gases therein, and a flash-boil doser mounted to the mixing can and configured to heat the reducing agent to drive the reducing agent to a predetermined pressure and to inject the reducing agent into the exhaust passageway of the mixing can.

Clause 27. The vehicle of clause 26, any other suitable clause, or any combination of suitable clauses, wherein the flash-boil doser comprises a doser body including a housing and a heat exchanger assembly.

Clause 28. The vehicle of clause 27, any other suitable clause, or any combination of suitable clauses, wherein the heat exchanger assembly is arranged in the housing and configured to heat the reducing agent thereby increasing a pressure within the heat exchanger assembly to drive injection of the reducing agent into the exhaust passageway.

Clause 29. The vehicle of clause 28, any other suitable clause, or any combination of suitable clauses, wherein the flash-boil doser further comprises a doser inlet coupled to the doser body that defines an inlet passageway that opens into the heat exchanger assembly to admit reducing agent from the reducing agent tank.

Clause 30. The vehicle of clause 29, any other suitable clause, or any combination of suitable clauses, wherein the flash-boil doser further comprises a doser outlet coupled to the doser body that defines an outlet passageway that opens from the heat exchanger assembly into the exhaust passageway.

Clause 31. The vehicle of clause 30, any other suitable clause, or any combination of suitable clauses, wherein the doser outlet is spaced apart axially from the doser inlet relative to a doser axis of the flash-boil doser.

Clause 32. The vehicle of clause 31, any other suitable clause, or any combination of suitable clauses, wherein the heat exchanger assembly includes (i) an outer sleeve shaped to define a spiral channel that wraps around the doser axis and opens toward the doser axis, (ii) an inner sleeve arranged in the outer sleeve to close the spiral channel to form a helical passageway between the outer sleeve and the inner sleeve that is in fluid communication with the inlet and outlet passageways, and (iii) at least one heater arranged around an outer surface of the outer sleeve and configured to conductively heat the outer sleeve to heat the reducing agent in the helical passageway.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A flash-boil doser adapted for use in an exhaust aftertreatment system to inject a reducing agent into an exhaust passageway of the exhaust aftertreatment system, the flash-boil doser comprising
a doser body including a housing and a heat exchanger assembly, the heat exchanger assembly arranged in the housing and configured to heat the reducing agent thereby increasing a pressure within the heat exchanger assembly to drive injection of the reducing agent into the exhaust passageway,
a doser inlet coupled to the doser body that defines an inlet passageway that opens into the heat exchanger assembly to admit reducing agent from an associated reducing agent tank, and
a doser outlet coupled to the doser body that defines an outlet passageway that opens from the heat exchanger assembly into the exhaust passageway, the doser outlet spaced apart axially from the doser inlet relative to a doser axis of the flash-boil doser,
wherein the heat exchanger assembly includes (i) an outer sleeve shaped to define a spiral channel that wraps around the doser axis and opens toward the doser axis, (ii) an inner sleeve arranged in the outer sleeve to close the spiral channel to form a helical passageway between the outer sleeve and the inner sleeve that is in fluid communication with the inlet and outlet passageways, and (iii) at least one heater arranged around an outer surface of the outer sleeve and configured to conductively heat the outer sleeve to heat the reducing agent in the helical passageway, and
wherein the doser outlet includes a pressure-activated outlet valve that blocks or allows flow through the outlet passageway, the pressure-activated outlet valve configured to move from a normally-closed position to an open position when a predetermined pressure within the helical passageway is reached to discharge the heated reducing agent from the helical passageway through the outlet passageway and into the exhaust passageway for mixing with the exhaust gases therein during use of the flash-boil doser in the exhaust aftertreatment system.

2. The doser of claim 1, wherein the inner sleeve is interference fit with the outer sleeve.

3. The doser of claim 1, wherein the heat exchanger assembly further includes a first guide plate coupled to a first end of the outer sleeve to form a heat exchanger inlet that opens into the helical passageway and a second guide plate coupled to a second end of the outer sleeve to form a heat exchanger outlet that opens into the outlet passageway, the first and second guide plates are configured to block the reducing agent from flowing into an inner passageway that extends axially through the inner sleeve.

4. The doser of claim 3, wherein the heat exchanger assembly further includes an insulation layer arranged in the inner passageway of the inner sleeve.

5. The doser of claim 1, wherein the inner sleeve is shaped to include an inner passageway that extends axially through the inner sleeve and is sized to receive a portion of the pressure-activated outlet valve such that the heat exchanger assembly is arranged around a portion of the pressure-activated outlet valve.

6. The doser of claim 5, wherein the heat exchanger assembly further includes an insulation layer arranged in the inner passageway of the inner sleeve around the portion of the pressure-activated outlet valve.

7. A reducing agent mixer for use in an exhaust aftertreatment system for an over-the-road vehicle, the reducing agent mixer comprising
a mixing can defining at least a portion of an exhaust passageway for receiving a flow of exhaust gases therein, and
a flash-boil doser mounted to the mixing can and configured to heat a reducing agent to drive the reducing agent to a predetermined pressure and to inject the reducing agent into the exhaust passageway of the mixing can, the flash-boil doser comprising
a doser body including a housing and a heat exchanger assembly, the heat exchanger assembly arranged in the housing and configured to heat the reducing agent thereby increasing a pressure within the heat exchanger assembly to drive injection of the reducing agent into the exhaust passageway,
a doser inlet coupled to the doser body that defines an inlet passageway that opens into the heat exchanger assembly to admit reducing agent from an associated reducing agent tank, and
a doser outlet coupled to the doser body that defines an outlet passageway that opens from the heat exchanger assembly into the exhaust passageway, the doser outlet spaced apart axially from the doser inlet relative to a doser axis of the flash-boil doser,
wherein the heat exchanger assembly includes (i) an outer sleeve shaped to define a spiral channel that wraps around the doser axis and opens toward the doser axis, (ii) an inner sleeve arranged in the outer sleeve to close the spiral channel to form a helical passageway between the outer sleeve and the inner sleeve that is in fluid communication with the inlet and outlet passageways, and (iii) at least one heater arranged around an outer surface of the outer sleeve and configured to conductively heat the outer sleeve to heat the reducing agent in the helical passageway, and
wherein the doser outlet includes a pressure-activated outlet valve that blocks or allows flow through the outlet passageway, the pressure-activated outlet valve configured to move from a normally-closed position to an open position when the predetermined pressure within the helical passageway is reached to discharge the heated reducing agent from the helical passageway through the outlet passageway and into the exhaust passageway for mixing with the exhaust gases therein during use of the flash-boil doser in the exhaust aftertreatment system.

8. The reducing agent mixer of claim 7, wherein the inner sleeve is interference fit with the outer sleeve.

9. The reducing agent mixer of claim 7, wherein the heat exchanger assembly further includes a first guide plate coupled to a first end of the outer sleeve to form a heat exchanger inlet that opens in to the helical passageway and a second guide plate coupled to a second end of the outer sleeve to form a heat exchanger outlet that opens into the outlet passageway, the first and second guide plates are configured to block the reducing agent from flowing into an inner passageway that extends through the inner sleeve.

10. The reducing agent mixer of claim 7, wherein the inner sleeve is shaped to include an inner passageway that extends axially through the inner sleeve and is sized to receive a portion of the pressure-activated outlet valve such that the heat exchanger assembly is arranged around a portion of the pressure-activated outlet valve.

11. The reducing agent mixer of claim 10, wherein the heat exchanger assembly further includes an insulation layer arranged in the inner passageway of the inner sleeve around the portion of the pressure-activated outlet valve.

12. An over-the-road vehicle, the vehicle comprising
an internal combustion engine configured to produce a flow of exhaust gases that are conducted through an exhaust passageway defined by an exhaust conduit, and
an exhaust aftertreatment system configured to treat the flow of exhaust gases, the system comprising
a reducing agent tank formed to store a reducing agent therein,
a mixing can defining at least a portion of the exhaust passageway for receiving the flow of exhaust gases therein, and
a flash-boil doser mounted to the mixing can and configured to heat the reducing agent to drive the reducing agent to a predetermined pressure and to inject the reducing agent into the exhaust passageway of the mixing can, the flash-boil doser comprising
a doser body including a housing and a heat exchanger assembly, the heat exchanger assembly arranged in the housing and configured to heat the reducing agent thereby increasing a pressure within the heat exchanger assembly to drive injection of the reducing agent into the exhaust passageway,
a doser inlet coupled to the doser body that defines an inlet passageway that opens into the heat exchanger assembly to admit reducing agent from the reducing agent tank, and
a doser outlet coupled to the doser body that defines an outlet passageway that opens from the heat exchanger assembly into the exhaust passageway, the doser outlet spaced apart axially from the doser inlet relative to a doser axis of the flash-boil doser,
wherein the heat exchanger assembly includes (i) an outer sleeve shaped to define a spiral channel that wraps around the doser axis and opens toward the doser axis, (ii) an inner sleeve arranged in the outer sleeve to close the spiral channel to form a helical passageway between the outer sleeve and the inner sleeve that is in fluid communication with the inlet and outlet passageways, and (iii) at least one heater arranged around an outer surface of the outer sleeve and configured to conductively heat the outer sleeve to heat the reducing agent in the helical passageway, and
wherein the doser outlet includes a pressure-activated outlet valve that blocks or allows flow through the outlet passageway, the pressure-activated outlet valve configured to move from a normally-closed position to an open position when a predetermined pressure within the helical passageway is reached to discharge the heated reducing agent from the helical passageway through the outlet passageway and into the exhaust passageway for mixing with the exhaust gases therein during use of the flash-boil doser in the exhaust aftertreatment system.

* * * * *